United States Patent
Okada et al.

(10) Patent No.: US 7,403,563 B2
(45) Date of Patent: Jul. 22, 2008

(54) IMAGE DECODING METHOD AND APPARATUS, AND TELEVISION RECEIVER UTILIZING THE SAME

(75) Inventors: Shigeyuki Okada, Ogaki (JP); Hideki Yamauchi, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 807 days.

(21) Appl. No.: 10/449,537

(22) Filed: Jun. 2, 2003

(65) Prior Publication Data
US 2003/0227976 A1    Dec. 11, 2003

(30) Foreign Application Priority Data
Jun. 7, 2002    (JP) .............. 2002-167733

(51) Int. Cl.
 *H04B 1/66* (2006.01)
(52) U.S. Cl. .............. 375/240.13; 375/240.25; 375/240.26; 375/240.16; 375/240.15; 375/240.14; 382/233; 382/235; 382/238; 382/236
(58) Field of Classification Search ............ 375/240.13, 375/240.25, 240.26, 240.12, 240.14, 240.16, 375/240.15; 382/233, 235, 236, 238
See application file for complete search history.

(56) References Cited

U.S. PATENT DOCUMENTS 5,552,831 A * 9/1996 Machida et al. ........ 375/240.16
6,594,790 B1 * 7/2003 Sato et al. .................. 714/746
7,013,077 B2 * 3/2006 Honjo .......................... 386/92

FOREIGN PATENT DOCUMENTS

| JP | 8-163575 A | 6/1996 |
| JP | 2002-44667 A | 2/2002 |
| JP | 2002-112276 | 4/2002 |

OTHER PUBLICATIONS

Chinese Office Action for corresponding foreign patent application No. 03142390.6.
Japanese Office Action for corresponding foreign Patent Application No. 2003-155131, dated May 16, 2006.

* cited by examiner

*Primary Examiner*—Shawn An
(74) *Attorney, Agent, or Firm*—McDermott Will & Emery LLP

(57) ABSTRACT

A variable-length decoding (VLD) unit performs a variable-length decoding on an MPEG video stream. An inverse quantization (IQ) unit computes a discrete-cosine-transform (DCT) coefficient by performing an inverse quantization on results of decoding by the VLD unit. An inverse-discrete-cosine-transform (IDCT) unit carries out an IDCT for the DCT coefficients computed by the IQ unit so as to convert frequency components into the original signals. A motion-compensated-prediction (MC) unit performs a best-effort reproduction processing on received frames, during the time until the arrival of a frame serving as a reference for decoding, and returns to a normal decoding processing after the reference frame has been received.

14 Claims, 10 Drawing Sheets

FIG. 4

| REFERENCE TARGET | SUBSTITUTE | REFERENCE SOURCE |
|---|---|---|
| ○ | — | ○ |
| △/× | ○/△ | △ |
| △/× | × | × |

FIG. 5

| REFERENCE TARGET | SUBSTITUTE | REFERENCE SOURCE |
|---|---|---|
| ○ | — | ○ |
| × | ○ | ○ |
| × | × | × |

US 7,403,563 B2

IMAGE DECODING METHOD AND APPARATUS, AND TELEVISION RECEIVER UTILIZING THE SAME

BACKGROUND OF THE INVENTION

1. Field of the Invention

The present invention relates to a technology for reproducing images, and it particularly relates to method and apparatus for reproducing coded image data, and to a television receiver that utilizes said method and apparatus.

2. Description of the Related Art

The digitalization of TV broadcasting is advancing by rapid strides. The digital broadcasting has already begun in BS (Broadcast Satellite) broadcasts and CS (Communication Satellite) broadcasts, and the plan is set for the digitalization of ground wave broadcasts as well. In digital TV broadcasting, the use of MPEG-2 (Moving Picture Expert Group 2), which is an international standard for data compression and expansion, makes it possible not only to transmit and store information at high efficiency but also to transmit multiple channels by a single repeater. It is also expected to provide greater convenience to the users.

On the other hand, the widespread use of portable terminals in recent years is expected to create greater needs for coding systems with high data compression ratio. Accordingly, investigations are being conducted on the use of MPEG-4 coding methods that can transmit images compressed at low bit rates. In digital TV broadcasting from now on, it seems that MPEG-4 will be used along with MPEG-2 for the distribution of image information.

In the digital TV broadcasting as mentioned above, it is necessary to extract coded image data from received signals and decode them. In the image coding by MPEG-2, inter-frame coding is done together with intra-frame coding, so that decoding according to the standard can not be carried out immediately after the reception of coded image data, when it is impossible to refer to the reference frames for inter-frame coding.

To resolve this problem, the inventor of the present invention proposed, in Japanese Patent Application Laid-Open No. 2002-112138, a digital broadcast receiving apparatus capable of receiving in the background and storing in advance one of a plurality of channels in preparation for the channel switching by the user, but has further come to realize that additional demands described as follows exist in connection with the subject matter. That is, in the image coding by MPEG-4, the data compression ratio is raised higher by holding the number of reference frames lower than MPEG-2 in order to increase the proportion of inter-frame coding, with the result that the delay time for coding is even longer. When the MPEG-4 system is employed for digital TV broadcasting, reference frames cannot be received for about four seconds, at the worst, after the start of reception, during which decoding of images cannot be started. Hence, images cannot be displayed immediately at power-on or channel switching of the receiving apparatus such as a television receiver, which will surely irritate the user. This is a great demerit for a product to be marketed.

SUMMARY OF THE INVENTION

The present invention has been made in view of foregoing circumstances, and an object thereof is to provide an image reproduction technology capable of reproducing and displaying images with best effort even in situations where inter-frame coding cannot be accomplished according to the standard.

A preferred embodiment according to the present invention relates to an image decoding method. This method includes reproducing data on a reproducible pixel block within each frame during a period when it is not possible to refer to a frame that serves as a reference for inter-frame coding, in a process of decoding a coded data sequence coded by performing at least one of an intra-frame coding processing and an inter-frame coding processing on image signals. As examples of "situations where it is not possible to refer to a frame that serves as a reference for inter-frame coding", there are a situation where the reference frame is not yet received at the time of receiving a coded data sequence and a situation where the reference frame is lost due to error, and so forth. In such cases, a reproducible pixel block can be reproduced within a received frame and can be displayed by best effort. Here, the reproduction of the pixel block means that the images are reproduced by some means, and it includes, in addition to the decoding processing that decodes intra-frame-coded or inter-frame-coded pixel data, a processing in which images to be decoded are filled in with or replaced with other substitute image data and a processing in which the images are interpolated using other pixel data.

As the reproducible pixel block, a pixel block on which an intra-frame coding processing has been performed may be decoded. As the reproducible pixel block, a pixel block on which an inter-frame coding processing has been performed may be decoded by using a pixel block of a reference-target frame that has already been reproduced. When a pixel block of the reference-target frame is not reproducible in a decoding processing of the pixel block on which the inter-frame coding processing has been performed, the decoding processing may be carried out using a substitute block of the reference-target frame. This substitute block may be a reference-target pixel block located at the position identical to that of a reference-source pixel block. In that case, the reference-target pixel block may be directly copied and may be used as a value of the reference-source pixel block. It is to be noted here that the pixel block mentioned here is generally a set of pixels of arbitrary size which serve as units for motion prediction required for the inter-frame coding, and is not limited to a block or macroblcok of specific size in MPEG.

In MPEG-4, I-VOP (video Object Plane) serving as a reference frame for the inter-frame coding is such that the intra-frame coding only is performed thereon and the I-VOP can be completely decoded by closed information available within an image frame in question. On the other hand, P-VOP and B-VOP are, in general, not only intra-frame coded but also inter-frame coded, so that all of the pixel block cannot be decoded using the information for the image frame alone and the complete decoding is not possible unless other image frames are referred to.

According to an image encoding method in this embodiment, even before any I-VOP serving as a reference frame is received, at least the intra-frame coded pixel block for P-VOP or B-VOP already received can be decoded and at least the thus decoded portion can be displayed. Moreover, if a pixel block of a frame-that a motion vector refers to is somehow reproduced by some means, the inter-frame coded pixel block can be decoded using its reference-target pixel block, and the thus decoded portion can be displayed. Moreover, when the reference-target pixel block is not reproducible, it can be substituted by other reproduction-displayed pixel block. Then, a pixel block located, for example, identical to the position of or surrounding the reference-target frame may be directly copied and used as a pixel block of a frame to be decoded. Alternatively, the decoding may be carried out on the assumption that a motion vector is referring to such the substitute pixel block. Moreover, the reference-target pixel block which is not reproducible may be substituted by a pixel block which a motion vector prepared for error concealment is referring to.

Another preferred embodiment according to the present invention relates also to an image decoding method. This method is such that, at the time of switching of a received channel of image signals coded by performing at least one of an intra-frame coding processing and an inter-frame coding processing thereon, a pixel block reproducible within a received frame is reproduced and then displayed without waiting for the reception of a frame that serves as a reference for inter-frame coding.

Still another preferred embodiment according to the present invention relates also to an image decoding method. This method is such that, at the time of power-on of apparatus that receives image signals coded by performing at least one of an intra-frame coding processing and an inter-frame coding processing thereon, a pixel block reproducible within a received frame is reproduced and then displayed without waiting for the reception of a frame that serves as a reference for inter-frame coding.

Still another preferred embodiment according to the present invention relates also to an image decoding method. This method is such that, at the time of switching of a received channel of coded image signals, images for a new channel after the switching are gradually reproduced and displayed within a reproducible limit.

Still another preferred embodiment according to the present invention relates also to an image decoding method. This method is such that, at the time of power-on of apparatus that receives coded image signals, images to be displayed after the power-on are gradually reproduced and displayed within a reproducible limit.

Still another preferred embodiment according to the present invention relates to an image decoding apparatus. This apparatus includes: a decoder which decodes a coded data sequence that is coded by performing at least one of an intra-frame coding processing and an inter-frame coding processing on image signals; and a memory unit which temporarily stores a flag that indicates whether or not a decoded frame is reproducible in units of block, wherein, in a situation where a reference frame for inter-frame coding cannot be referred to, the decoder decodes a pixel block on which the intra-frame coding processing has been performed, and the memory unit sets the flag on the pixel block to a value indicative of having been reproducible.

This flag indicating a reproduction state is a flag showing that whether a certain reproduction indication has been made or not. The cases when the reproduction indication was made include not only a case when the intra-frame coded or inter-frame coded pixel block is decoded and displayed, but also a case when the decoding processing is not carried out and the pixel block is displayed by utilizing the substitute pixel block or by interpolating the pixels.

If the flag indicates that a pixel block of a reference-target frame is reproducible, the decoder may decode the pixel block on which the inter-frame coding processing has been performed, using the pixel block of the reference-target frame, and the memory unit may set the flag on the pixel block after decoding to a value indicative of having been reproducible and store the value.

If the flag indicates that a pixel block of a reference-target frame is not reproducible, the decoder may utilize a pixel block located at the same position as the pixel block to be decoded and utilizes the same-position pixel block for the pixel block to be decoded, in the course of decoding the pixel block on which the inter-frame coding processing has been performed. Here, when the pixel block is said to be located at the same position, it is not limited to the reference-target pixel block located exactly at the same position as the reference-source pixel block, but the concept of being located at the same position includes a case when pixel blocks are located in the vicinity thereof. Even when the pixel block is displayed using the substitute pixel block, the memory unit may set the flag to a value indicative of having been reproducible and store the value.

If the flag indicates that a pixel block of a reference-target frame is not reproducible, the decoder may interpolate pixels surrounding the reference-target pixel block so as to thereby replace a pixel block after decoding, in the course of decoding the pixel block on which the inter-frame coding processing has been performed. In such a case, the memory unit may store the flag in a manner such that the flag is set to a value indicating the reproduction is not possible.

In order to draw a distinction between the case where decoding and display are both performed using the reference-target pixel block and the case where the decoding using the reference-target pixel block is not performed but the reproduction is carried out using the substitute pixel block, a flag indicating a decoding state and a flag indicating a display state may be prepared, so that both the decoding-state-indicating flag and the display-state-indicating flag may be set to ON in the former case whereas the decoding-state-indicating flag may be set to OFF and the display-state-indicating flag only may be set to ON in the latter case. In this manner, when two different flags are used, the only pixel block whose flag indicating the decoding state is ON may be utilized as the reference-target pixel block, and the pixel block whose flag indicating the display state is ON may be allowed for the use with the substitute block.

Still another preferred embodiment according to the present invention relates to a television receiver. This television receiver includes: a receiving block which receives broadcasting waves; a processing block which processes received signals; and a reproduction block which reproduces the signals that have been, processed by the processing block, wherein the processing block includes a decoder which decodes a coded image data sequence extracted from the received signals, and a memory unit which temporarily stores a flag that indicates whether or not a decoded frame is reproducible in units of block, and wherein the decoder reproduces data on a reproducible pixel block within each frame, based on the flag on a pixel block of a reference-target frame, until a first reference frame is received.

At the time of power-on of apparatus or switching of a broadcasting channel, for example, it takes some time until the reference frame is received. According to this apparatus, however, the images data for the reproducible pixel blocks are displayed by best effort by some means, so that the images can be displayed instantly without causing the user to wait.

Still another preferred embodiment according to the present invention relates also to a television receiver. This television receiver includes: a receiving block which receives broadcasting waves; a processing block which processes received signals; and a reproduction block which reproduces the signals that have been processed by the processing block, wherein the processing block includes a decoder which decodes a coded image data sequence extracted from the received signals and, at the time of switching of a received channel of coded image signals, the decoder decodes images for a new channel after the switching, within a reproducible limit, and wherein the reproduction block displays gradually the images for the new channel, based on decoding by the decoder.

Still another preferred embodiment according to the present invention relates also to a television receiver. This television receiver includes: a receiving block which receives broadcasting waves; a processing block which processes received signals; and a reproduction block which reproduces the signals that have been processed by the processing block, wherein the processing block includes a decoder which decodes a coded image data sequence extracted from the received signals and, at the time of power-on of the television receiver, the decoder decodes images to be displayed after the power-on, within a reproducible limit, and wherein the reproduction block displays gradually the images after the power-on, based on decoding by the decoder.

It is to be noted that any arbitrary combination of the above-described structural components and expressions changed between a method, an apparatus, a system, a computer program, a recording medium and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIG. 4 is a table with which to explain a rule of best-effort reproduction processing.

FIG. 5 is a table with which to explain another rule of best-effort reproduction processing.

DETAILED DESCRIPTION OF THE INVENTION

The invention will now be described based on the following embodiments, which do not intend to limit the scope of the present invention but exemplify the invention. All of the features and the combinations thereof described in the embodiments are not necessarily essential to the invention.

Figure 1:
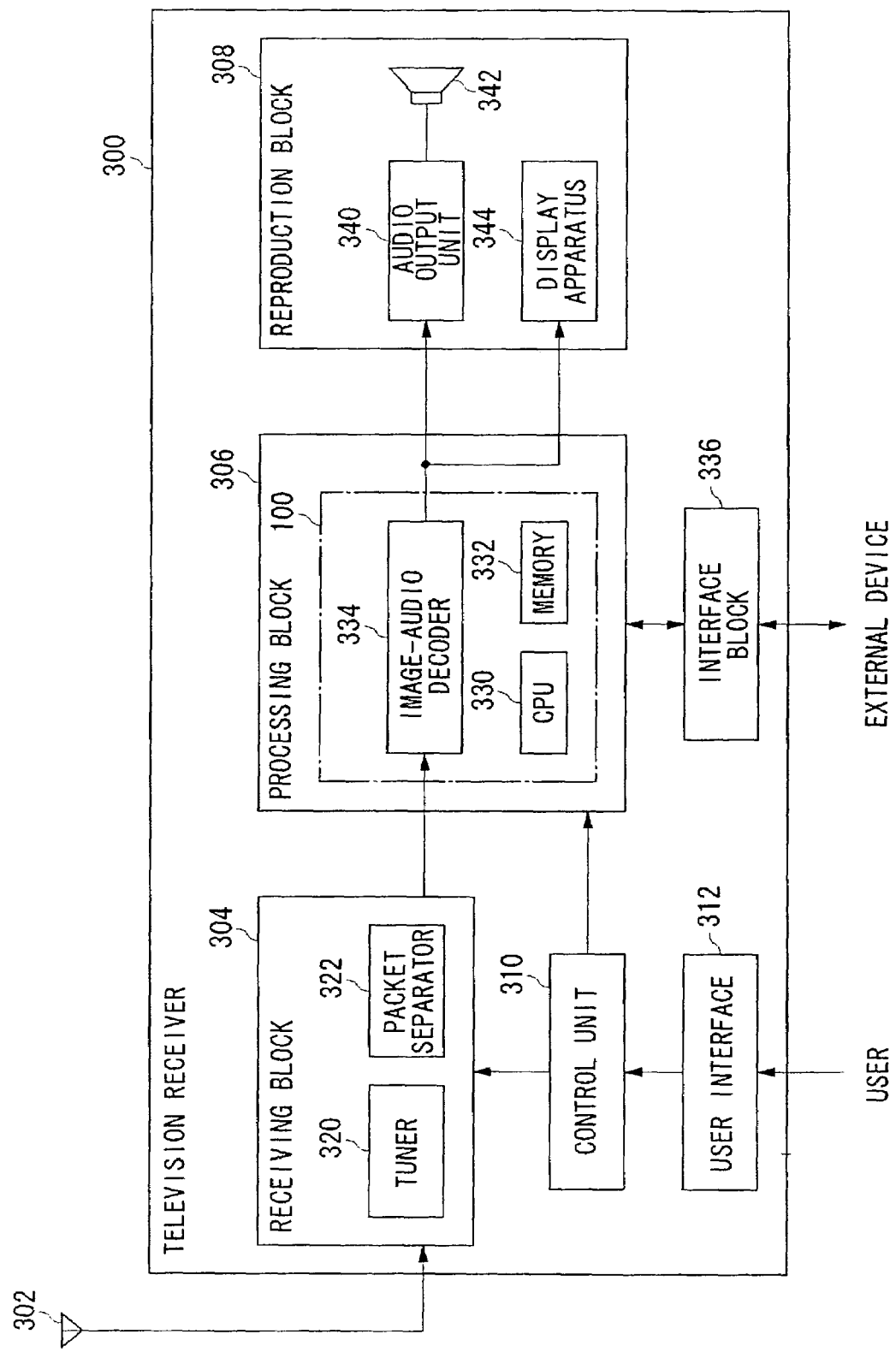
FIG. 1 is a block diagram showing a structure of a television receiver according to a preferred embodiment.

FIG. 1 is a block diagram showing a structure of a television receiver 300 according to a preferred embodiment. The television receiver 300 includes an antenna 302, a receiving block 304 which receives broadcasting waves via the antenna 302, a processing block 306 which processes image and audio data obtained as a result of a processing by the receiving block 304, a reproduction block 308 which reproduces audio and images decoded by the processing block 306, a user interface 312 which receives an instruction from a user, and a control unit 310 which controls the receiving block 304 and the processing block 306, based on an instruction from the user interface 312. An interface block 336 outputs decoded image data from the processing block 306, to an external device as appropriate.

The receiving block 304 includes a tuner 320 and a packet separator 322. The tuner 320 selects a transponder including a channel selected by the user, and performs a QPS demodulation. A stream containing a plurality of transport packets obtained as a result of the decoding is sent to the packet separator 322. The packet separator 322 is a multiplexer, and it separates packets corresponding to a desired channel from other packets and outputs them to the processing block 306.

An image-audio decoder 334 in the processing block 306, which is linked to and cooperates with a CPU 330 and a memory 332, decodes the image and audio data coded at and transmitted from a broadcasting station. The image-audio decoder 334 decodes inputted packets, and outputs the audio data and the image data to an audio output unit 340 and a display apparatus 344, respectively. The audio output unit 340 performs a predetermined processing on the inputted audio data, so that the audio is finally outputted to a speaker 342. Components, involved with the image decoding in the structure of the processing block 306 which is comprised of image-audio decoder 334, the CPU 330 and the memory 332, is collectively called an image decoding unit 100.

The user interface 312 receives from the user the switching of broadcasting channel. The control unit 310 sends a channel switching signal to the receiving block 304, and sends a reception-start signal to the processing block 306. Upon receiving these control signals, the tuner 320 in the receiving block 304 switches the broadcasting channel so as to start new reception, and a mode is switched in the processing block 306 so that the image decoding unit 100 can carry out a best-effort processing immediately after the reception.

Figure 2:
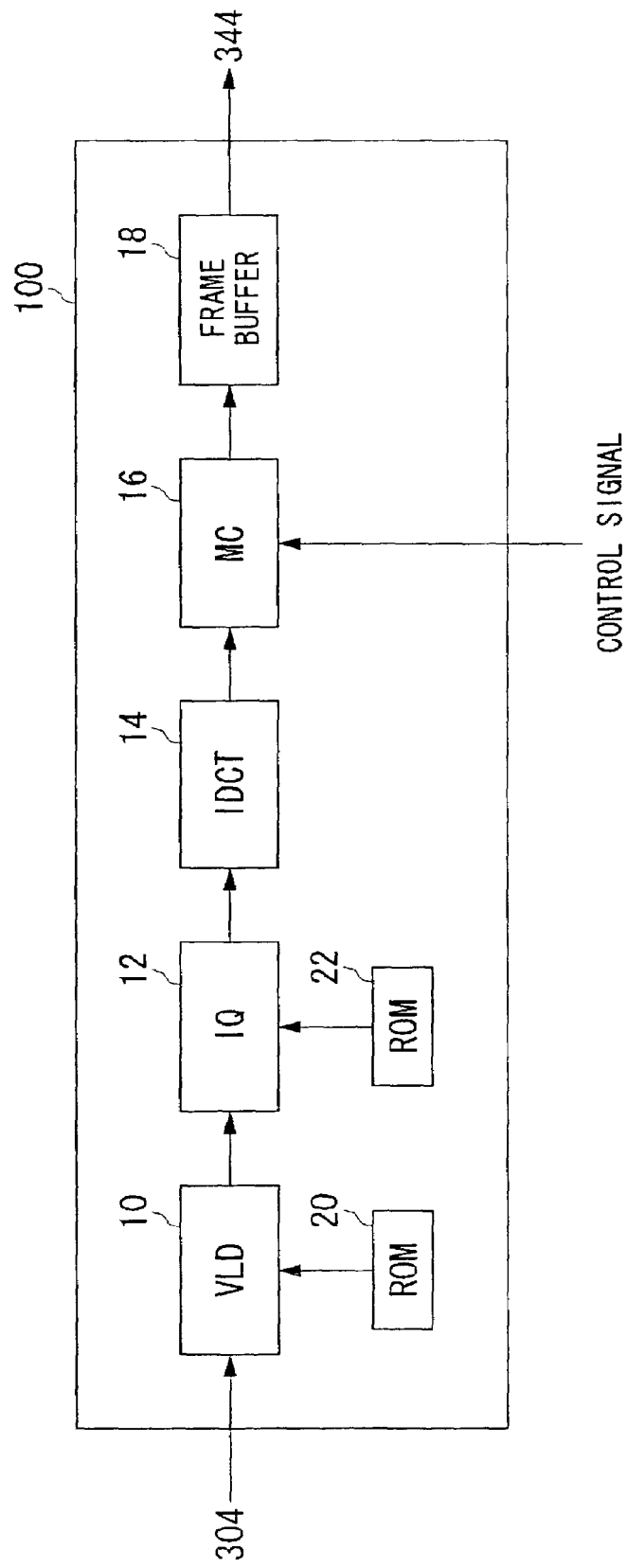
FIG. 2 is a functional block diagram showing a structure of an image decoding unit shown in FIG. 1.

FIG. 2 is a block diagram showing a structure of the image decoding unit 100. The image decoding unit 100 is an example of image decoding apparatus according to the present invention, and this image decoding unit 100 may be mounted on a single chip LSI. Moreover, a major structure of this image decoding unit 100 and the receiving block 304 shown in FIG. 1 may be mounted on a single chip LSI.

A VLD unit 10 performs a variable-length decoding on an MPEG video stream received by the receiving block 304, based on a Huffman code stored in a Huffman table stored in a ROM 20. An IQ unit 12 computes a DCT (Discrete Cosine Transform) coefficient by performing an inverse quantization, based on a quantization threshold value stored in a quantization table stored in the ROM 22, on results of decoding by the VLD unit 10. An IDCT unit 14 carries out an IDCT (Inverse Discrete Cosine Transform) for the DCT coefficients computed by the IQ unit 12 so as to convert frequency components into the original signals. An MC unit 16 performs an MC (Motion Compensated prediction) so as to reproduce images. The thus reproduced images are stored in a frame buffer 18 and are outputted to the display apparatus 344.

In this manner, the image decoding unit 100 decodes an inputted MPEG video stream and generates the reproduced image data sequence continuous in a time-series manner. It is to be noted that the MPEG video stream is an example of a "coded data sequence" in the present invention.

In MPEG, a compression technique called inter-frame prediction is employed. The inter-frame prediction compresses inter-frame data based on temporal correlation among frames. In the inter-frame prediction, bidirectional prediction is performed. The bidirectional prediction uses both forward prediction for predicting a current reproduced image from a past reproduced image or picture, and backward prediction for predicting a current reproduced image from a future reproduced image.

In MPEG-2, this bidirectional prediction defines three types of pictures called I picture (Intra-Picture), P picture (Predictive-Picture) and B picture (Bidirectionally predictive-Picture). An I picture is an image independently produced by an intra-frame coding processing, irrespective of past and future reproduced images, and can be decoded by itself. All of the macroblocks within the I picture are produced by the intra-frame coding processing. A P picture is produced by a forward coding processing using the prediction that is prediction from a past I or P picture. The macroblock within the P picture includes both an intra-frame coded picture and an inter-frame coded picture by forward prediction.

The B picture is produced by the inter-frame coding processing using the bidirectional prediction. In the bidirectional prediction, a B picture is produced by one of the following three predictions.
(1) Forward Prediction; prediction from a past I picture or P picture.
(2) Backward Prediction; prediction from a future I picture or P picture.
(3) Bidirectional Prediction; prediction from past and future I pictures or P pictures.

A macroblock within the B picture contains an intra-frame coded picture and an inter-frame coded picture by a forward prediction, inverse prediction or interpolation prediction.

In MPEG-4, the time series of video object is called VO (Video object) and each image that constitutes the VO is called VOP (Video Object Plane). The VOP corresponds to the picture in MEPG-2. There are the following four types of VOPs depending on the prediction coding used.
(1) I-VOP; intra-frame coded VOP.
(2) P-VOP; inter-frame forward prediction coded VOP.
(3) B-VOP; inter-frame bidirectional prediction coded VOP.
(4) S-VOP; sprite VOP.

The first three VOPs, which are I-VOP, P-VOP and B-VOP correspond to I picture, P picture and B picture in MPEG-2, respectively.

In MPEG, the coded image data are expressed as bit stream data having a hierarchical structure. Motion pictures handled in MPEG are constituted by, for example, 30 frames for a second. In MPEG-2, the frame generally corresponds to the picture. In MPEG-2, the collection of pictures is called GOP (Group of Picture), so that the random access is possible in units of GOP. Since the random access is carried out, at least one P picture is required within the GOP. In MPEG-4, the collection of VOP is treated as GOV (Group of VOP).

In MPEG-2, the number of I pictures allotted within each GOP is extremely small. For example, there is one frame at the most among picture of 15 to 30 frames that constitute the GOP. In MPEG-4, the number of I-VOP within the GOV is further reduced in order to raise the compression ratio. Thus, there is about one frame or so among a 120-frame VOP. Moreover, in MEPG-4, there are many cases where the usage of B-VOP which requires a large buffer capacity for decoding is restricted, so that the GOV is structured by I-VOP and P-VOP only.

Images within a GOP or GOV cannot be decoded during the time until an I picture is received in MPEG-2 or an I-VOP is received in MPEG-4. Thus, there results a waiting time at power-on or channel switching of a receiving apparatus, when images cannot be displayed until an I picture or I-VOP, which serves, as reference for decoding, is received. This waiting time is determined by the proportion of I pictures in the GOP or that of I-VOPs in the GOV. At proportions as mentioned above, however, it may, at worst, be about one second for MPEG-2 and about four seconds for MPEG-4. While it is applicable to any of MPEG-1, MPEG-2 and MPEG-4, the present invention will produce the greatest effect with MPEG-4, which features high data compression ratios and longer waiting time for decoding. In the following description, the terms "picture" and "GOP" in MPEG-2 are used for the simplicity of explanation only; the intention thereof is not to exclude the application to MPEG-4 but to encompass the concept of "VOP" and "GOV" of MPEG-4 as well.

Referring back to FIG. 2, the MC unit 16 not only performs decoding of images based on a motion compensated prediction according to the MPEG standard, but also, as will be described hereunder, reproduces certain images with best effort even in a state where it is impossible to refer to any reference frame for decoding. At power-on or channel switching, the MC unit 16 activates such a best-effort reproduction processing according to the control signal from the control unit 310 shown in FIG. 1, but after a reference frame is received, returns to a normal decoding processing automatically.

Figure 3:
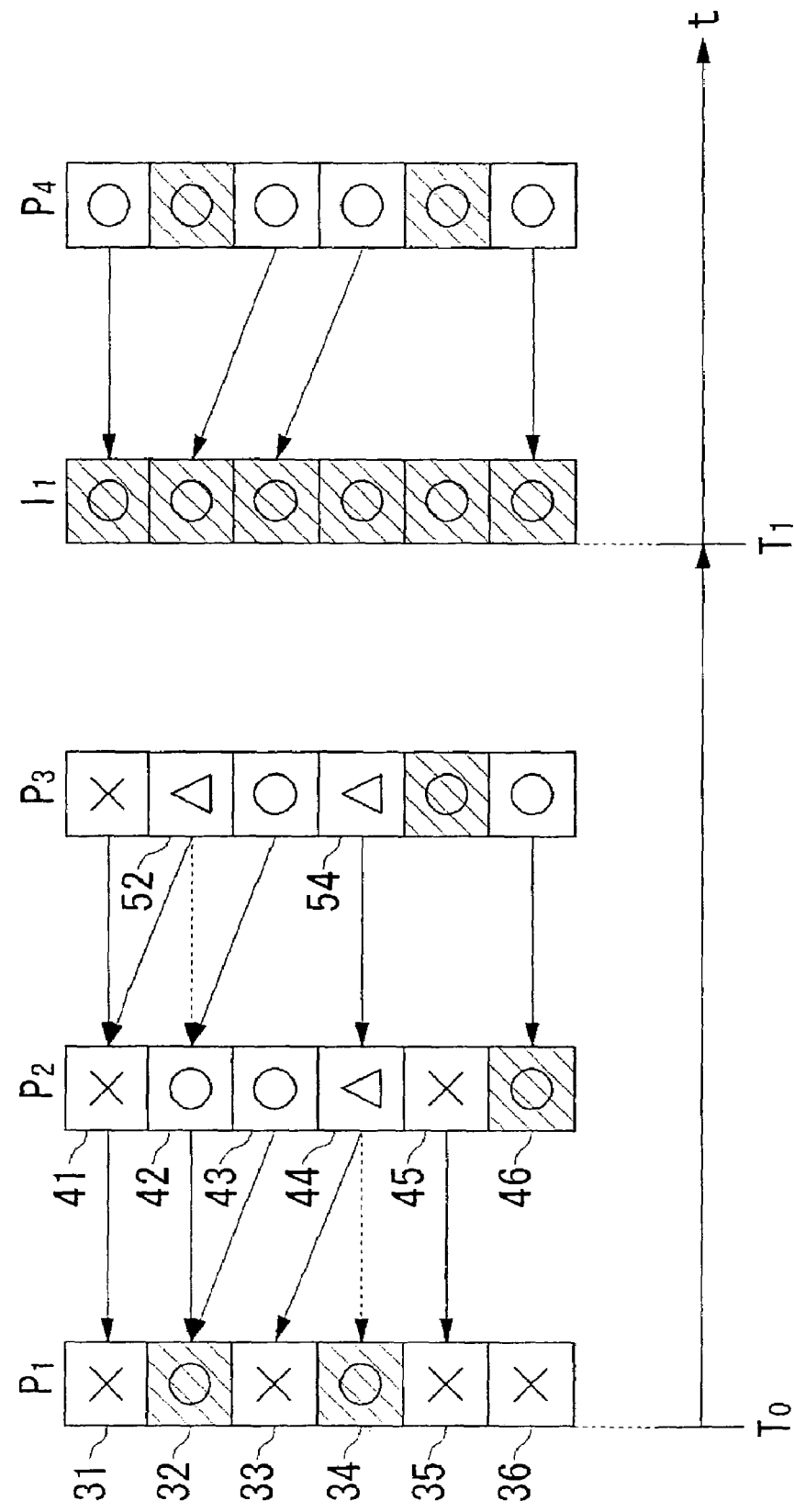
FIG. 3 illustrates a reproduction processing before the reception of a reference frame.

Referring to FIG. 3, a description is given of a best-effort reproduction processing before the reception of a reference frame. In the motion compensated prediction of MPEG, the motion vector is obtained in units of macroblocks. A macroblock is comprised of four blocks of 8×8 pixels. In FIG. 3, for the sake of simplicity, the P pictures and I picture are each represented by six macroblocks, and the motion vectors are represented by solid lines with arrows. Moreover, the substitute vectors to be described later are represented by dashed lines with arrows. In FIG. 3, the macroblocks with oblique lines are intra-frame-coded macroblocks (hereinafter referred to simply as "intra MB"), and the other macroblocks are inter-frame-coded macroblocks (hereinafter referred to simply as "non-intra MB"). Also, the macroblocks referred to by the motion vectors are called reference-target MBs, and the macroblocks referring thereto are called reference-source MBs. Moreover, the macroblocks referred to by substitute vectors, as will be described later, are called substitute MBs.

Suppose that the reception of an MPEG video stream starts at time $T_0$, then a first P picture $P_1$ is received, and subsequently a second P picture $P_2$ and a third P picture $P_3$ are received. And then, suppose that a first I picture $I_1$ is received at time $T_1$ and a fourth P picture $P_4$ is received. For example, time $T_0$ represents the power-on time of the apparatus or the switching time of a received channel while time $T_1$ represents an instant when the first reference frame is received after the power-on or channel switching.

The interval from time $T_0$ to time $T_1$ is the duration for a best-effort reproduction processing by the MC unit 16 shown in FIG. 2, and after time $T_1$ the processing of the MC unit 16 switches to a normal decoding processing. In terms of the above-mentioned example where the power of the apparatus is set to ON or the received channel is switched, the reproducible pixel blocks for the frames received after the power-on or channel switching are displayed by best effort during this best-effort reproduction processing, and are gradually shifting to the normal display state at $T_1$.

In the best-effort reproduction processing, each macroblock sets a flag to indicate whether a reproduction was possible or not, and the frame buffer 18 shown in FIG. 2 stores the flag for each macroblock together with the image data of the frame. As the flag for each macroblock, a decoding OK flag, which indicates that the macroblock has been decoded according to the MPEG standard, and a display OK flag, which indicates that the macroblock has been displayed, are prepared. When the decoding OK flag and the display OK flag are both ON (hereinafter referred to as "decoding OK status"), it is meant that the macroblock has been decoded according to the standard and displayed. In FIG. 3, this status is represented by the circle. When the decoding OK flag is off and the display OK flag is on (hereinafter referred to as "decoding NG/display OK status"), it is meant that decoding has not been done but a display has been made after a certain reproduction processing. In FIG. 3, such status is represented by triangle. When the decoding OK flag and the display OK flag are both off (hereinafter referred to as "display NG status"), it is meant that both the decoding according to the standard and the certain reproduction processing have not been done and no display has been made. In FIG. 3, this status is represented by X.

In the first P picture $P_1$, the intra MBs 32 and 34 only can be decoded whereas the non-intra MBs 31, 33, 35 and 36 cannot be decoded. The intra MBs 32 and 34, which are decodable, are thus decoded, and the decoding OK flag and the display OK flag are both set to ON. That is, these intra MBs are set in a decoding OK status. The non-intra MBs 31, 33, 35 and 36, which cannot be decoded, are made up for by or filled in with a background image or interpolated image. The interpolated image is, for instance, composed by the average values of the surrounding images. For these non-intra MBs, the decoding OK flag and the display OK flag are both set to OFF and a display NG status is set. The P picture $P_1$ thus reproduced is finally outputted to the frame buffer 18 shown in FIG. 2 and then displayed.

Next, at the second P picture $P_2$, the first MB 41 to the fifth MB 45 are non-intra MBs, and the sixth MB 46 is an intra MB. For the sixth MB 46, a normal decoding is done, and a decoding OK status is set. The reference-target MB for the first MB 41, as indicated by the motion vector, is the first MB 31, which is in the identical position of the first P picture $P_1$, and since this MB 31 is in the display NG status, a decoding processing using the MB 31 cannot be carried out. For the first MB 41 of the second P picture $P_2$, therefore, the decoding OK flag and the display OK flag are both set to OFF and a display NG status is set.

As for the second MB 42, the reference-target MB is the second MB 32 of the first P picture $P_1$, and since this MB 32 is in the decoding OK status, a normal decoding can be carried out using the MB 32, and a decoding OK status is set. For the third MB 43, too, the reference-target MB is the second MB 32 of the first P picture $P_1$, and the decoding is done using the MB 32, and a decoding OK status is set.

The situation is different for the fourth MB 44. The reference-target MB is the third MB 33 of the first P picture $P_1$, which is in a display NG status. Accordingly, the decoding using the MB 33 cannot be carried out. Thus, the reference-target MB is changed by assuming that the motion vector referring to the third MB 33 of the first P picture $P_1$ is referring to the fourth MB 34 of the first P picture $P_1$, which is in the position thereof identical to the reference-source MB 44. The motion vector when the reference-target MB is changed like this is called the substitute vector, and the reference-target MB after the change is called the substitute MB. The fourth MB 44, which is a reference source, is filled in with the substitute MB of the first P picture $P_1$ by directly copying it. For the fourth MB 44 thus reproduced, the decoding OK flag is set to OFF and the display OK flag to ON, and a decoding NG/display OK status is set.

As for the fifth MB 45, the reference-target MB is the fifth MB 35, which is in the identical position of the first P picture $P_1$, and since the MB 35 is in the display NG status, neither decoding nor copying of a substitute MB can be carried out, and a display NG status is set. In place thereof, the fifth MB 45 is filled in with or embedded with a background image or interpolated image.

The same holds true for the third P picture $P_3$. The reference-target MB of the second MB 52 is the first MB 41 of the second P picture $P_2$, and since the MB 41 is in the display NG status, the second MB 42, which is in the identical position of the second P picture $P_2$, is referred to for use as the substitute MB by a substitute vector. In this case, the substitute MB which is now the MB 42 is in a decoding OK status, so that it is directly copied to the second MB 52, which is thus set in a decoding NG/display OK status. The reference-target MB of the fourth MB 54 is the fourth MB 44, which is in the identical position of the second P picture $P_2$, and since the MB 44 is in the "decoding NG/display OK" status, it is directly copied into the fourth MB 54 of the third P picture $P_3$. The fourth MB 54 is thus set in a "decoding NG/display OK" status.

At time $T_1$, when the first I picture $I_1$ is received, the best-effort reproduction processing up to this point is discontinued and a normal decoding processing is performed from here on. The I picture $I_1$, which is comprised only of intra MBs, can be decoded without referring to other frames. The fourth P picture $P_4$, which is received thereafter, can be decoded completely by referring to the I picture $I_1$.

It is to be noted that where a video stream is comprised only of I pictures and P pictures, it is only necessary to refer to a immediately preceding frame, so that flags may be prepared by the number of macroblocks in a single frame only and may thus be overwritten sequentially.

FIG. 4 is a table with which to explain the rules of best-effort reproduction processing. When the reference target MB is in a decoding OK status (indicated by the circle in FIG. 4), the reference-source MB can be decoded and a decoding OK status (indicated by the circle in FIG. 4) is set thereto. When the reference-target MB is not in a decoding OK status, that is, it is in a decoding NG/display OK status (the triangle in FIG. 4) or in a display NG status (X in FIG. 4), and the substitute MB is in a decoding OK status (the circle in FIG. 4) or in a decoding NG/display OK status (the triangle in FIG. 4), the reference-source MB is substituted by the substitute MB and a decoding NG/display OK status (the triangle in FIG. 4) is set thereto. When the reference-target MB is not in a decoding OK status (the triangle/X in FIG. 4) and the substitute MB is in a display NG status (the triangle in FIG. 4), the reference-source MB can neither be decoded nor substituted by the substitute MB, so that a display NG status (X in FIG. 4) is set thereto.

In the above description, two flags, namely, the decoding OK flag and the display OK flag, are used to indicate the status of reproduction, thereby drawing a distinction between the case where a decoding and display are both performed and the case where decoding is not performed but a display is made by substituting it by a substitute MB. However, a best-effort reproduction processing may also be carried out by using a display OK flag only to indicate whether a display has been made or not without drawing a distinction between the two cases as mentioned above. Whether a display has been made after a decoding according to the standard or after a substitution by a substitute MB, the display OK flag is set to ON, and this state is called a display OK status. Where neither a decoding according to the standard nor a substitution by a substitute MB has been accomplished, the display OK flag is set to OFF, and this state is called a display NG status. In the display NG status, the display is filled in with or embedded with a background image or interpolated image.

FIG. 5 is a table with which to explain the rules of best-effort reproduction processing when the display OK flag only is used. When the reference-source MB is in a display OK status (indicated by the circle in FIG. 5), a display is made by decoding the reference-source MB by the use of the reference-target MB. In this case, the reference-source MB is in a display OK status (the circle in FIG. 5). When the reference-target MB is in a display NG status (X in FIG. 5) and the substitute MB is in a display OK status (the circle in FIG. 5), the substitute MB is copied into the reference-source MB. In this case, too, the reference-source MB is in a display OK status (the circle in FIG. 5). Moreover, when the reference-target MB is in a display NG status (X in FIG. 5) and the substitute MB is also in a display NG status (X in FIG. 5), the reference-source MB can neither be decoded nor substituted by the copying of the substitute MB, so that a display NG status (X in FIG. 5) is set thereto.

Based on the above-described structure, a procedure of decoding images according to the present embodiments will be described with reference to flowcharts shown in FIGS. 6 to 9.

Figure 6:
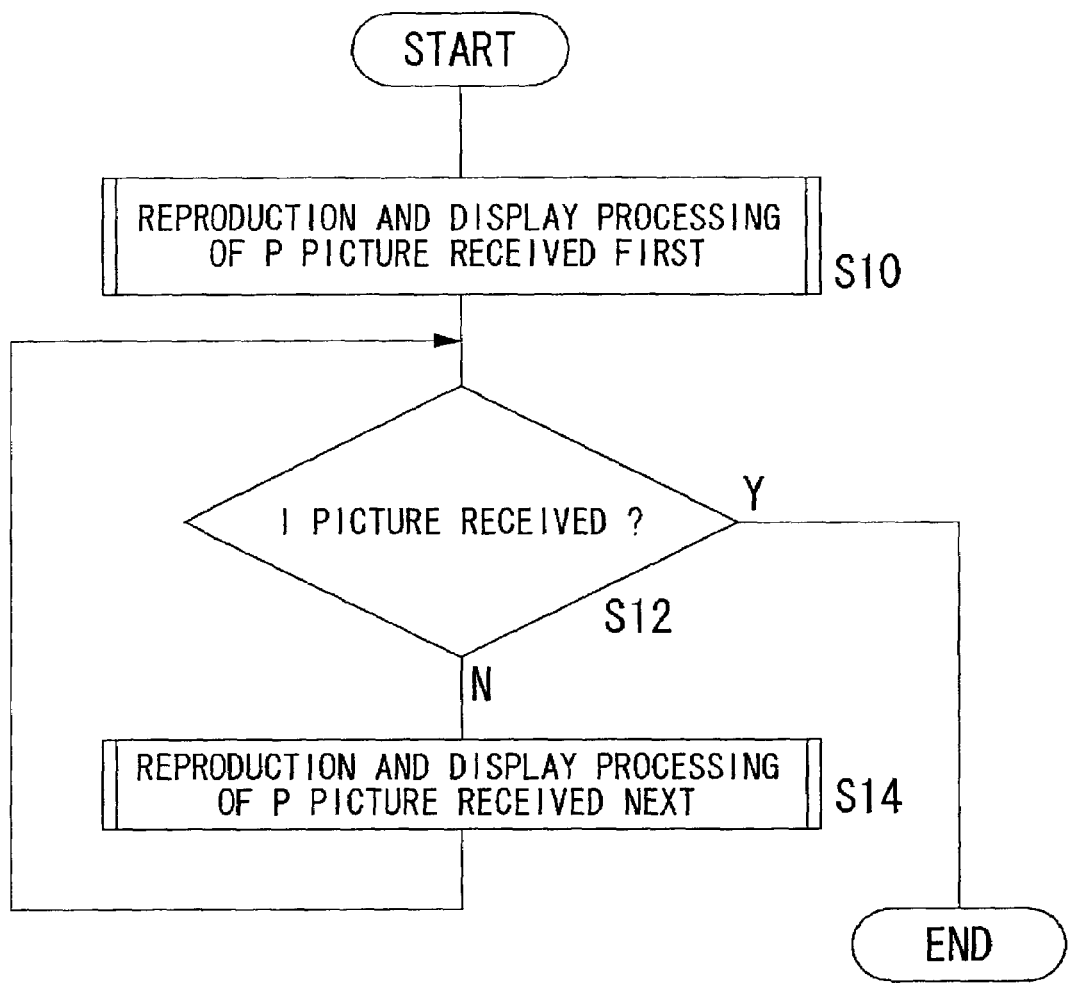
FIG. 6 is a flowchart showing the overall flow of the image reproduction and display processing with best effort, according to a preferred embodiment.

FIG. 6 is a flowchart showing the overall flow of the image reproduction and display processing with best effort when the reception of a video stream is started. The reproduction and display processing of a P picture received first is carried out (S10). Next, if an I picture is received (Y of S12), the best-effort reproduction and display processing will come to an end to be replaced by a normal decoding processing. If an I picture is not received (N of S12), the reproduction and display processing of a P picture received next will be performed (S14). Upon completion of the reproduction and display processing of the P picture, the processing returns to step S12 and then the steps S12 and S14 are repeated. In this manner, best-effort reproduction and display processing are carried out during the time until an I picture is received.

Figure 7:
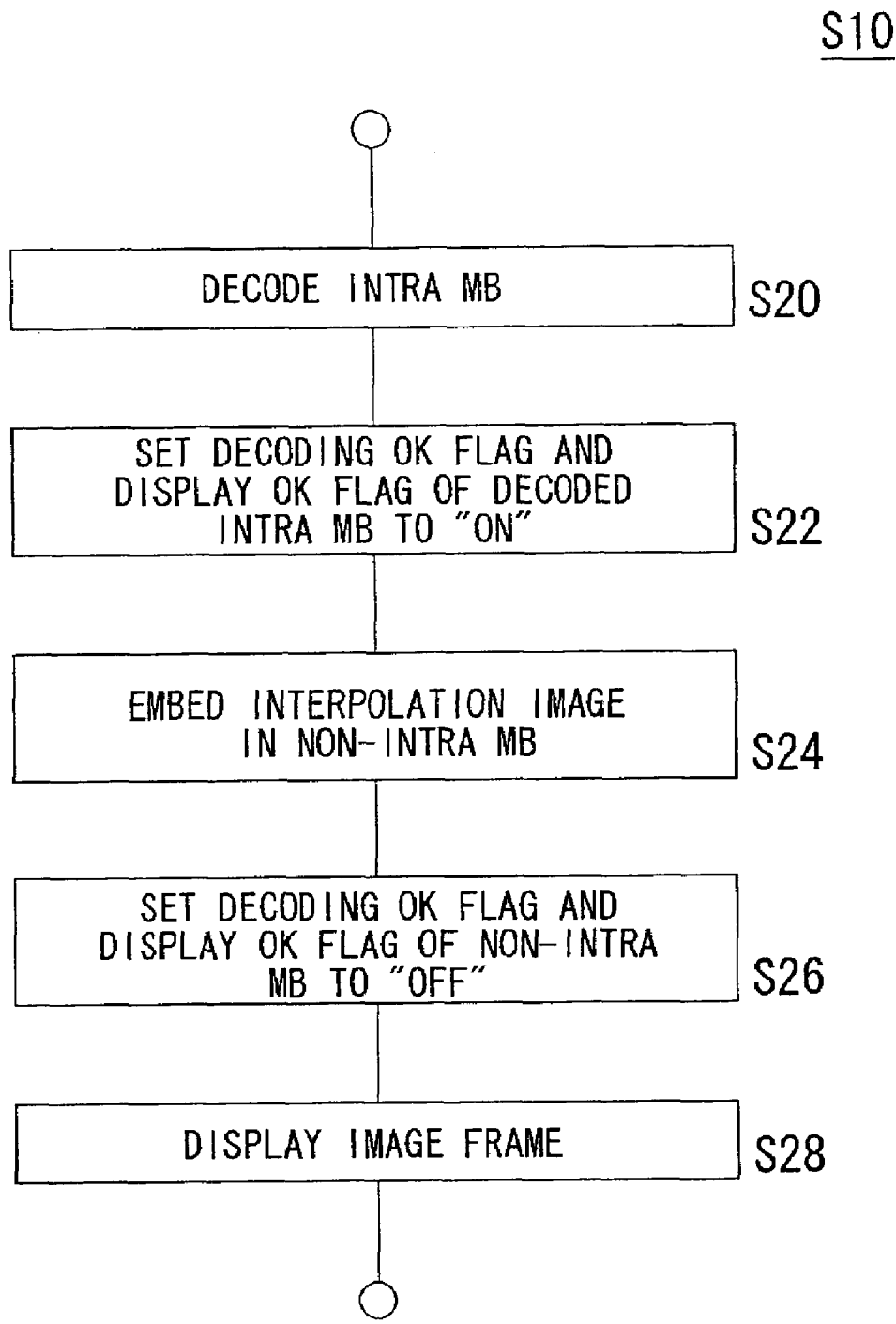
FIG. 7 is a flowchart showing a detailed procedure for the reproduction and display processing of a first received P picture shown in FIG. 6.

FIG. 7 is a flowchart that shows a detailed procedure for the reproduction and display processing of the first received P picture represented by step S10 in FIG. 6. An intra MB of the first P picture is decoded (S20). The decoding OK flag and the display OK flag of the decoded intra MB are both set to ON (S22). Next, the non-intra MB, which cannot be decoded due to the absence of a frame to be referred to, is filled in by the use of a background image or interpolation image (S24). The decoding OK flag and the display OK flag of the non-intra MB are both set to OFF (S26). An image frame thus reproduced is displayed (S28).

Figure 8:
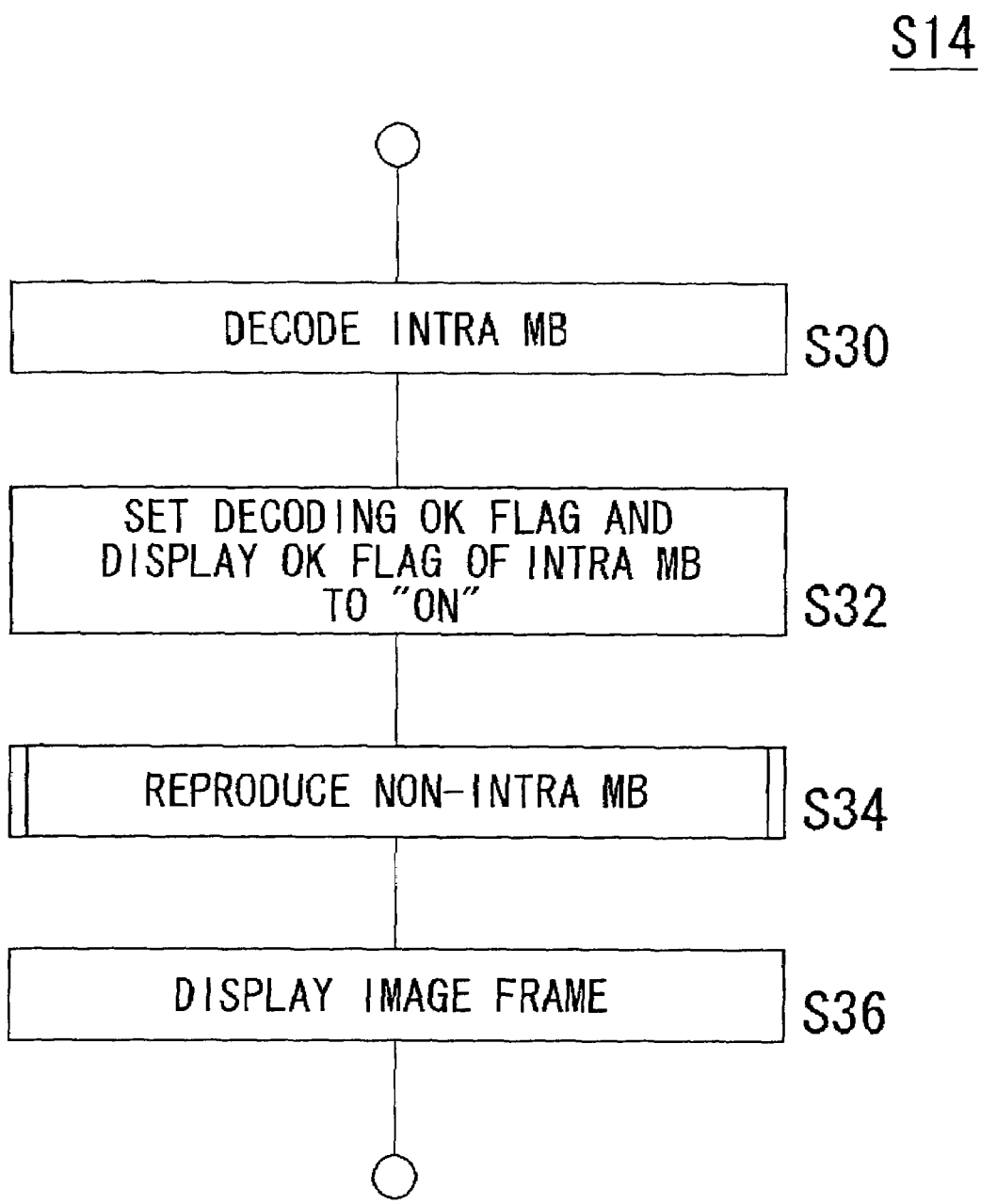
FIG. 8 is a flowchart showing a detailed procedure for the reproduction and display processing of the second and subsequent P pictures shown in FIG. 6.

FIG. 8 is a flowchart that shows a detailed procedure for the reproduction and display processing of the second and subsequent P pictures represented by step S14 in FIG. 6. In a manner similar to the first P picture as shown in FIG. 7, the intra MB is decoded in a normal manner (S30), and the decoding OK flag and the display OK flag of the intra MB are both set to ON (S32). Next, the non-intra MB is reproduced (S34), and finally an image frame thus reproduced is displayed (S36).

Figure 9:
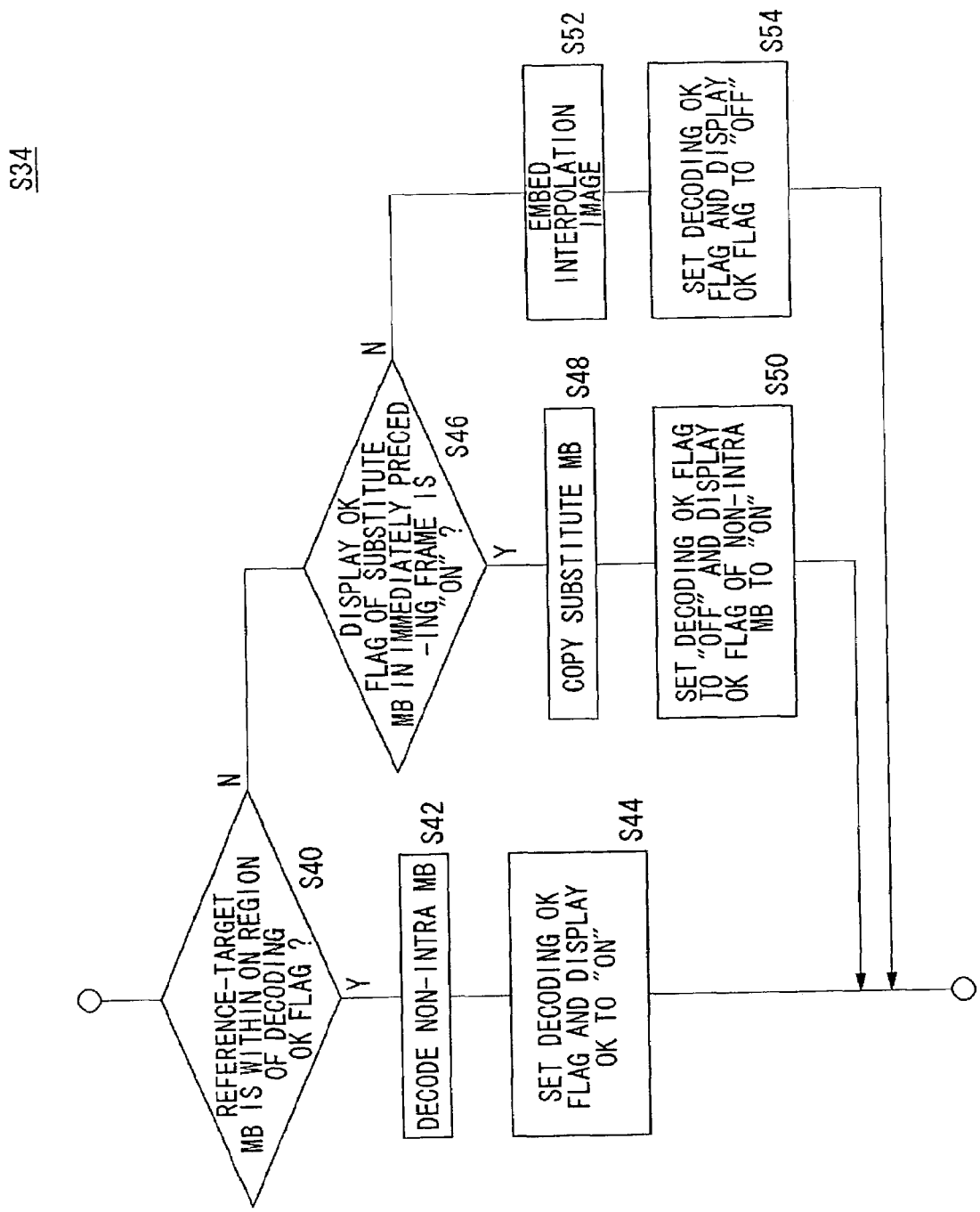
FIG. 9 is a flowchart showing a detailed procedure for the reproduction processing of a non-intra MB shown in FIG. 8.

FIG. 9 is a flowchart that shows a detailed procedure for the reproduction processing of the non-intra MB represented by step S34 in FIG. 8. A check is made to see whether or not the reference-target MB of the non-intra MB to be reproduced is within the ON region of the decoding OK flag of the image frame referred to or not (S40). Since a macroblock is comprised of four blocks, it is judged to be within the ON region of the decoding OK flag if the decoding OK flags for all the four blocks are ON. If the decoding OK flag for even one of the blocks of the reference-target MB is OFF, then the reference-target MB must be judged to be not within the ON region of the decoding flag.

If the reference-target MB is within the ON region of the decoding OK flag (Y of S40), the non-intra MB is decoded using the reference-target MB (S42). The decoding OK flag and the display OK flag of the decoded non-intra MB are both set to ON (S44).

If the reference-target MB is not within the ON region of the decoding OK flag (N of S40), a check is made to see whether or not the display OK flag of a substitute MB is ON, where the substitute MB is the macroblock in the position identical to the reference-target MB in the immediately preceding image frame (S46). When the display ON flag of the substitute MB is ON (Y of S46), the image of the substitute MB is used in substitution by directly copying it into the reference-source MB (S48). For the non-intra MB reproduced in such a manner, the decoding OK flag is set to OFF, and the display OK flag is set to ON (S50).

When the display ON flag of the substitute MB is OFF (N of S46), the reference-source MB is filled in with or embedded with a background image or interpolation image (S52). For the non-intra MB reproduced in such a manner, the decoding OK flag and the display OK flag are both set to OFF (S54).

Figure 10:
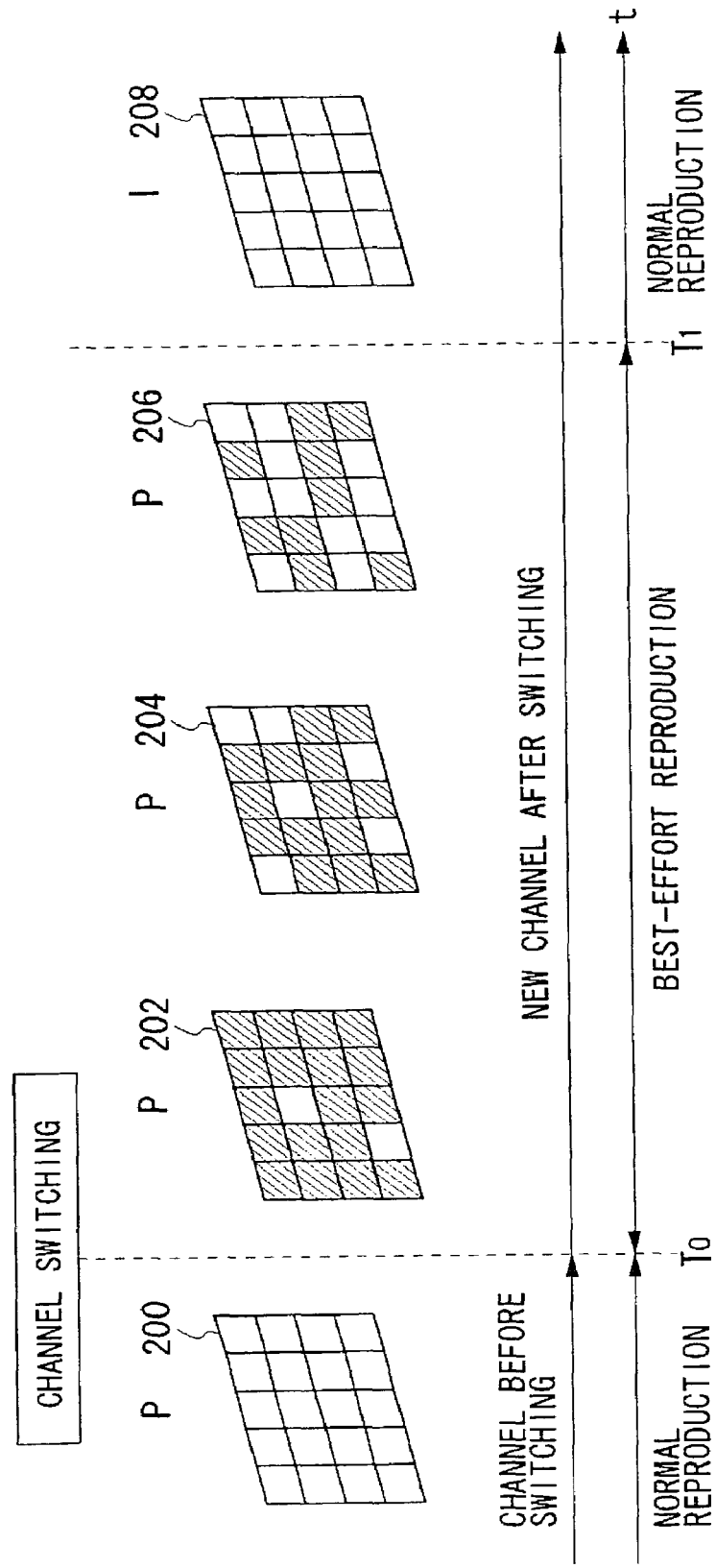
FIG. 10 illustrates how images are displayed at the time of then switching of broadcasting channel by a television receiver.

FIG. 10 illustrates how the images are displayed at the time of the switching of broadcasting channel by the television receiver 300. Before the channel switching at time $T_0$, image signals before the channel switching are received. At the time $T_0$ when the channel is switched, started is the reception of image signals for a new channel after the switching. A P picture 200 received immediately before this channel switching is decoded and displayed by using I picture and/or P picture received until the channel switching.

Immediately after the channel switching at time $T_0$, P picture or B picture for the new channel is generally received, and it will take approximately 2 seconds in MPEG-2 and approximately 4 seconds in MPEG-4 until the first I picture is received. In the example shown in FIG. 10, P pictures 202, 204 and 206 are received during the time period from the channel switching time $T_0$ until the reception time $T_1$ of the first I picture, and the above-described best-effort reproduction processing is carried out during this time period. During the best-effort reproduction processing, reproducible pixel blocks for the first P picture 202 are partially displayed, and reproducible pixel blocks for the next P picture 204 are decoded and displayed by utilizing the reproduced blocks of the P picture 202, as shown in FIG. 10. Moreover, in the similar manner, the next P picture 206 is decoded by utilizing the P picture 204 which is immediately before the P picture 206, and is partially displayed. The number of displayed pixel blocks increase with time, and the images will be gradually shifted toward the images of an I picture 208 at time $T_1$. After time $T_1$, the normal reproduction processing according to the standard will be carried out. Thus, the images for the new channel can be partially displayed even immediately after the channel switching, thus shortening the user's waiting time and avoiding irritating the user.

Figure 11:
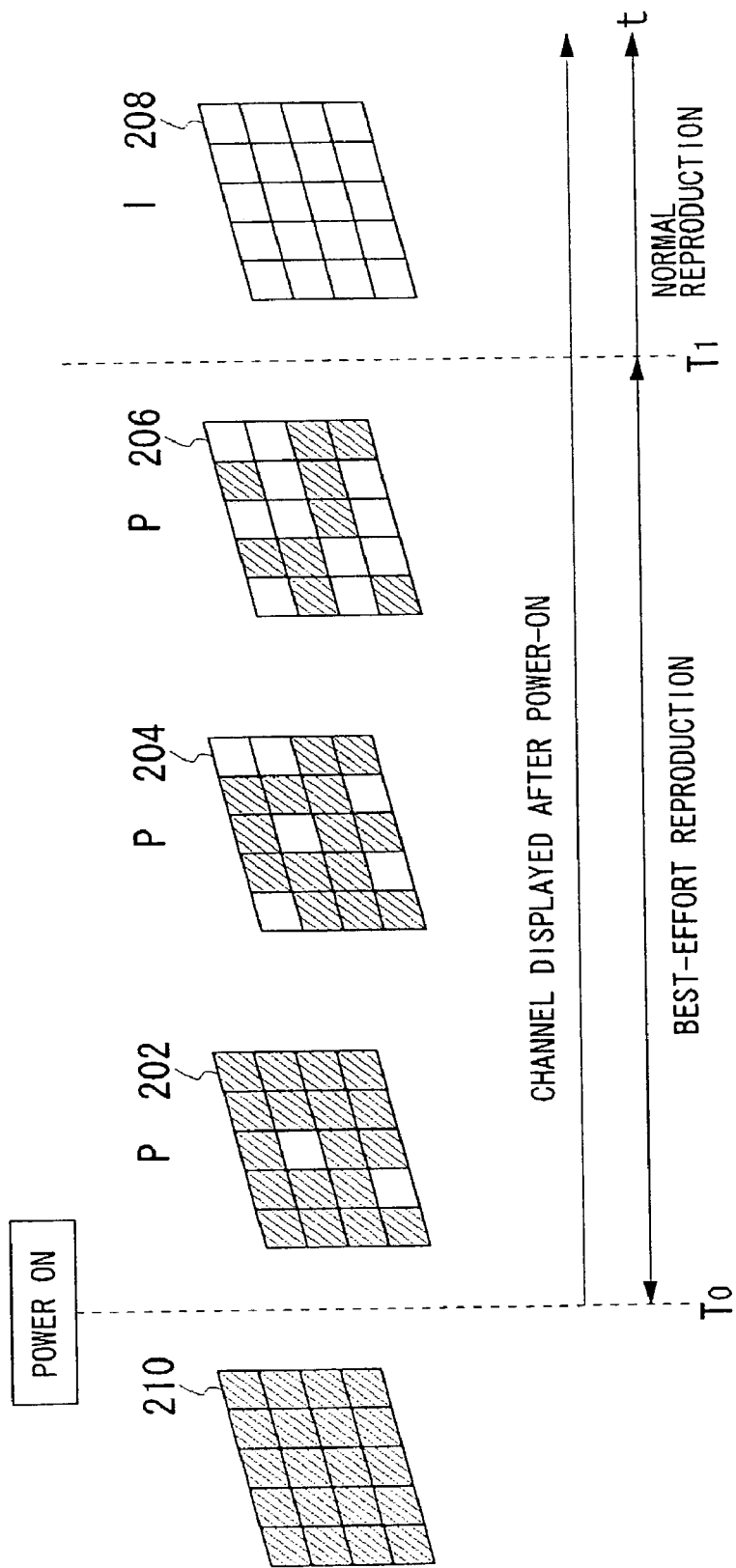
FIG. 11 illustrates how images are displayed at the time of power-on by a television receiver.

FIG. 11 illustrates how the images are displayed at the time of the power-on by the television receiver 300. Nothing is displayed in a screen 210 before the power-on, and, at the time $T_0$ of the power-on, started is the reception of image signals for the channel displayed after the power-on. In the manner similar to that described with reference to FIG. 10, P pictures 202, 204 and 206 are received during the time period from the power-on time $T_0$ until the reception time $T_1$ of the first I picture, and the above-described best-effort reproduction processing is carried out during this time period, and the reproducible pixel blocks for the first P picture 202 are partially displayed and then the images will be gradually shifted toward the images of an I picture 208 at time $T_1$. After time $T_1$, the normal reproduction processing according to the standard will be carried out. Thus, the images can be partially displayed even immediately after the power-on, so that the user's irritation caused by the conventional fact that nothing is displayed on the screen until the normal reproduction processing becomes possible can be avoided.

According to the present embodiments, as has been described, when an MPEG stream in the ground wave digital TV broadcasting, especially, a video stream by the MPEG4 method, is to be received, the received frames may be reproduced and displayed with best effort during the interval before the stream serving as reference for decoding is received. This shortens the waiting time for image output and improves the response at power-on or channel switching.

The present invention has been described based on the embodiments which are only exemplary. It is understood by those skilled in the art that there exist other various modifications to the combination of each component and process described above and that such modifications are encompassed by the scope of the present invention.

In the present embodiments, the case without B pictures has been described. However, even when B pictures are present, best-effort reproduction may be accomplished using flags. For decoding B pictures, however, frames before and after the present one are required and thus it is necessary to use the frame buffer 18 of larger capacity that can store frames to be referred to and their flags.

In the present embodiments, the substitute MB is directly copied, but decoding may be carried out using a substitute MB in place of a reference-target MB. Moreover, as a substitute MB, a macroblock, which is in the position identical to the reference-source MB in the immediately preceding frame, is used, but a macroblock which is not limited to the identical position but in the neighborhood thereof may be used. Moreover, as a substitute MB, another reference-target MB may be used by utilizing a motion vector that is prepared for error concealment. Furthermore, according to the above description, where the reference-target MB is in the position identical to that of the reference-source MB, namely, where the motion vector is zero, decoding cannot be accomplished when the reference-target MB is in a display NG status. In this case, too, decoding may be carried out by using a neighboring microblock as the substitute MB or using the reference-target MB for error concealment. Thus, there may be a variety of modifications of best-effort reproduction.

Moreover, according to the above description, best-effort reproduction processing is carried out on the assumption that there are no I pictures immediately after the start of reception. The condition where an I picture cannot be referred to can also happen when an I picture cannot be obtained due to some defective reception. In such a case, too, the best-effort reproduction processing according to the present invention may be used as an error processing.

By implementing the present embodiments, the images can be reproduced and displayed even in situations where the reference frame required for decoding cannot be referred to.

Although the present invention has been described by way of exemplary embodiments, it should be understood that many changes and substitutions may further be made by those skilled in the art without departing from the scope of the present invention which is defined by the appended claims.

What is claimed is:

1. An image decoding method, including reproducing data on a reproducible pixel block within each frame during a period when it is not possible to refer to a frame that serves as a reference for inter-frame coding, in a process of decoding a coded data sequence coded by performing at least one of an intra-frame coding processing and an inter-frame coding processing on image signals,
   wherein the frame that serves as a reference for inter-frame coding is an intra frame and the frame that does not serve as a reference for inter-frame coding is a non-intra frame, and
   wherein when decoding starts from a non-intra frame, said period when it is not possible to refer to a frame that serves as a reference for inter-frame coding includes from the non-intra frame to a first intra frame following the non-intra frame.

2. An image decoding method according to claim 1, wherein a pixel block on which an intra-frame coding processing has been performed is decoded as the reproducible pixel block.

3. An image decoding method according to claim 2, wherein a pixel block on which an inter-frame coding processing has been performed is decoded, as the reproducible pixel block, by using a pixel block of a reference-target frame that has already been reproduced.

4. An image decoding method according to claim 3, wherein, when a pixel block of the reference-target frame is not reproducible in a decoding processing of the pixel block on which the inter-frame coding processing has been performed, the decoding processing is carried out using a substitute block for the reference-target frame.

5. An image decoding method according to claim 1, wherein a pixel block on which an inter-frame coding processing has been performed is decoded, as the reproducible pixel block, by using a pixel block of a reference-target frame that has already been reproduced.

6. An image decoding method according to claim 5, wherein, when a pixel block of the reference-target frame is not reproducible in a decoding processing of the pixel block on which the inter-frame coding processing has been performed, the decoding processing is carried out using a substitute block of the reference-target frame.

7. An image decoding apparatus, including:
   a decoder which decodes a coded data sequence that is coded by performing at least one of an intra-frame coding processing and an inter-frame coding processing on image signals; and
   a memory unit which temporarily stores a flag that indicates whether or not a decoded frame is reproducible in units of block,
   wherein, in a situation where a reference frame for inter-frame coding cannot be referred to, said decoder decodes a pixel block on which the intra-frame coding processing has been performed, and said memory unit sets the flag on the pixel block to a value indicative of having been reproducible.

8. An image decoding apparatus according to claim 7, wherein said decoder decodes a pixel block reproducible within a received frame, without waiting for the reception of a frame that serves as a reference for inter-frame coding.

9. An image decoding apparatus according to claim 7, wherein, at the time of power-on of the image decoding apparatus, said decoder decodes a pixel block reproducible within a received frame, without waiting for the reception of a frame that serves as a reference for inter-frame coding.

10. An image decoding apparatus according to claim 7, wherein, if the flag indicates that a pixel block of a reference-target frame is reproducible, said decoder decodes the pixel block on which the inter-frame coding processing has been performed, using the pixel block of the reference-target frame, and said memory sets the flag on the pixel block after decoding to a value indicative of having been reproducible and stores the value.

11. An image decoding apparatus according to claim 10, wherein, if the flag indicates that a pixel block of a reference-target frame is not reproducible, said decoder utilizes a pixel block located at the same position as the pixel block to be decoded and utilizes the same-position pixel block for the pixel block to be decoded, in the course of decoding the pixel block on which the inter-frame coding processing has been performed.

12. An image decoding apparatus according to claim 10, wherein, if the flag indicates that a pixel block of a reference-target frame is not reproducible, said decoder interpolates pixels surrounding the reference-target pixel block so as to thereby replace a pixel block after decoding, in the course of decoding the pixel block on which the inter-frame coding processing has been performed.

13. An image decoding apparatus according to claim 7, wherein, if the flag indicates that a pixel block of a reference-target frame is not reproducible, said decoder utilizes a pixel block located at the same position as the pixel block to be decoded and utilizes the same-position pixel block for the pixel block to be decoded, in the course of decoding the pixel block on which the inter-frame coding processing has been performed.

14. An image decoding apparatus according to claim 7, wherein, if the flag indicates that a pixel block of a reference-target frame is not reproducible, said decoder interpolates pixels surrounding the reference-target pixel block so as to thereby replace a pixel block after decoding, in the course of decoding the pixel block on which the inter-frame coding processing has been performed.

* * * * *